United States Patent [19]

Ellis

[11] Patent Number: 4,747,951

[45] Date of Patent: May 31, 1988

[54] METHOD FOR RECOVERING WATER OF REDUCED SALINITY FROM HIGH SALINITY WATER

[75] Inventor: John R. B. Ellis, Kentfield, Calif.

[73] Assignee: Chevron Research Company, San Francisco, Calif.

[21] Appl. No.: 525,930

[22] Filed: Sep. 19, 1983

Related U.S. Application Data

[63] Continuation of Ser. No. 399,603, Jul. 19, 1982, abandoned.

[51] Int. Cl.⁴ .............................................. B01D 13/00
[52] U.S. Cl. ..................................... 210/649; 210/689; 210/783
[58] Field of Search ................................. 210/649–655, 210/689, 783, 321, 350, 400, 401, 433.2, 490, 491, 492, 500.2, 502, 505, 508

[56] References Cited

U.S. PATENT DOCUMENTS

| | | | |
|---|---|---|---|
| 2,986,515 | 5/1961 | Wyllie | 210/33 |
| 3,207,061 | 9/1965 | Zaromb | 210/350 |
| 3,236,768 | 2/1966 | Litt | 210/6 |
| 3,436,213 | 4/1969 | Norris | 210/664 X |
| 3,482,701 | 12/1969 | Zaromb | 210/350 |
| 3,615,024 | 10/1971 | Michaels | 210/490 |
| 3,617,552 | 11/1971 | Will et al. | 210/649 |
| 3,742,946 | 7/1973 | Grossman | 210/500.2 |
| 3,817,379 | 6/1974 | Zipilivan et al. | 210/321.1 |
| 4,194,998 | 3/1980 | Fanta et al. | 210/689 |

Primary Examiner—Richard V. Fisher
Attorney, Agent, or Firm—S. R. La Paglia; J. W. Ambrosius; V. J. Cavalieri

[57] ABSTRACT

Process for recovering water of reduced salinity by contacting a semipermeable hydrophilic composite sheet with high salinity water and recovering a lower salinity water from the water sorbed in the sheet by applying sufficient physical pressure to force the water out of the sheet.

8 Claims, 1 Drawing Sheet

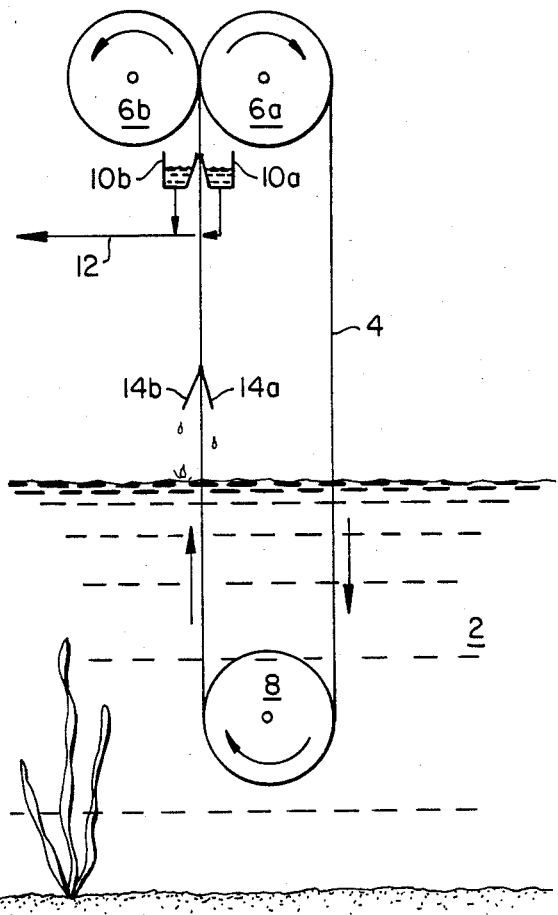
FIG._1.
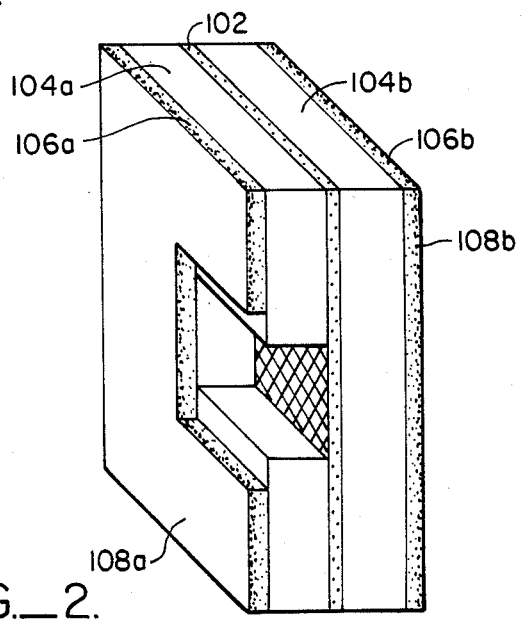
FIG._2.

METHOD FOR RECOVERING WATER OF REDUCED SALINITY FROM HIGH SALINITY WATER

This is a continuation of application Ser. No. 399,603, filed July 19, 1982, now abandoned.

BACKGROUND OF THE INVENTION

Various methods are currently available to recover water of reduced salinity from seawater and brackish water, such as vapor-compression distillation, flash distillation, electrolysis, and reverse osmosis. Reverse osmosis employing a semipermeable membrane has the advantage over other methods of requiring a lower energy input per 1,000 gallons of desalted water recovered. However, the energy input is still a significant cost factor and facilities must be provided to pump the high salinity water to high pressure (pressure in excess of the osmotic pressure of the more concentrated saline water leaving the system) and to contain and support the semipermeable membrane at high pressure. For example, the energy input for recovering desalted water from brackish water (10,000 ppm dissolved salt content) has been calculated to be about 20 KWH/1,000 gallons. The corresponding input for seawater (35,0000 ppm dissolved salt content) would be over 40 KWH/1,000 gallons with the possibility of reducing this value to about 25 KWh/1,000 gallons if a power recovery turbine were installed in the concentrated waste water stream. It would be desirable to find a less capital and energy intensive method for recovering desalted water. The present invention is such a process.

SUMMARY OF THE INVENTION

This invention is directed to a process for recovering water of reduced salinity which comprises:

(a) contacting a high salinity water with a composite sheet having at least an outer layer and an inner layer, said outer layer forming a semipermeable barrier capable of allowing the passage of water while restricting the passage of ions and said inner layer forming a hydrophilic layer, whereby said sheet selectively sorbs relatively ion free water into said inner layer through said outer layer;

(b) withdrawing the composite sheet and the sorbed relatively ion free water from contact with the high salinity water;

(c) placing the sheet under sufficient physical pressure to force at least part of the sorbed relatively ion free water out of the sheet; and (d) recovering a lower salinity water from the relatively ion free water leaving the sheet.

As used herein "composite sheet" refers to a sheet containing at least two different materials in contiguous layers. The term "semipermeable" refers to the ability of the outer layer to readily allow the passage of water across its surface while excluding the passage of ions or other solutes.

"High salinity water" refers to water containing at least about 2000 ppm of dissolved salts. The present invention is particularly useful for recovering lower salinity water from seawater. Seawater usually contains 35,000 ppm of dissolved salts.

BRIEF DESCRIPTION OF THE DRAWINGS

FIG. 1 is a diagrammatic representation of one embodiment of the process that constitutes this invention.

FIG. 2 is a magnified view of a cross section of one type of sheet which may be used to carry out the invention.

DESCRIPTION OF THE INVENTION

The invention may be most easily explained by reference to FIG. 1. Seawater is allowed to move freely through a region 2. A continuous composite belt 4 formed from a composite sheet is looped over an upper pressure roller 6a and a lower guide roller 8, the latter roller being located below the surface of the seawater in region 2. A second upper pressure roller 6b is located adjacent to the upper pressure roller 6a with the belt 4 passing between them. Directly below upper pressure rollers 6a and 6b are two fresh water collection trays 10a and 10b located on opposite sides of the belt and connected to recovered desalted water pipe 12. A pair of wiper blades 14a and 14b continuously remove adhering seawater from the outer surfaces of the belt. Other means for removing adhering seawater, such as by a compressed air blast and/or reflux of a small portion of the recovered desalted water, may be also used.

In operation the composite belt 4 revolves slowly over rollers 6a and 8. That portion of the belt below the surface of the seawater absorbs relatively ion free water through its outer semipermeable surface while excluding most ions and other solutes. As the moving composite belt leaves the surface of the water it passes between wiper blades 14a and 14b which remove any film of seawater which is adhering to the surface of the belt. As the belt passes over the upper pressure roller 6a, it also passes between upper pressure roller 6b which in combination exert sufficient physical pressure on the belt to squeeze a portion of the absorbed desalted water out of the belt. The desalted water is collected in desalted water collection trays 10a and 10b and is recovered via pipe 12.

The structure of the composite sheet used to carry out the process as described above may be understood by reference to FIG. 2. A supporting woven layer 102 is sandwiched between and contiguous with two hydrophilic inner layers 104a and 104b. Covering both outside surfaces of the sheet are two outer layers 106a and 106b. The outer most portion of outer layers 106a and 106b forms the opposing surfaces 108a and 108b of the sheet and constitute the semipermeable boundary through which water must pass to reach the underlying hydrophilic layers 104a and 104b.

The outer semipermeable layer is the principal barrier that prevents the passage of ions from the high salinity water outside the sheet into the hydrophilic inner layers. Therefore, the outer semipermeable layer should allow relatively high water flux across its outer surface while restricting the passage of ions or solutes which may be present in the water. Membranes having the general characteristics required for the outer layer are known and have been used in conventional processes employing reverse osmosis to recover desalted water. The materials used to prepare such sheet would also generally be suitable for preparing the outer semipermeable layer of the sheet used in this invention. These materials include cellulose acetate and various polymers and copolymers such as, for example, polysulphones, polyacrylonitriles, aromatic polyamides, aromatic polyhydrazides, polybenzimidazolones, polyepiamine/amides, polyepiamine/ureas, polyethyleneimine/ureas, sulfonated polyfuranes, polybenzimidazoles, and polypiperazine isophthalamides.

The inner hydrophilic layer collects the relatively ion free water that passes through the outer semipermeable layer and holds it until forced out by the pressure rollers or other pressure exerting means. This inner layer must have a sufficiently high free energy of hydration to provide the osmotic pressure difference needed for adequate water flux across the outer layer. At the same time, it must be possible to force the sorbed water back out of the inner layer without damaging the structure. Hydrophilic materials which can be used to form the inner layer include polyacrylamide gels and anhydroglucose polymers such as dextran.

A supporting layer to give mechanical support to the functional layers, i.e., semipermeable and hydrophilic layers, will usually be present. Woven materials or film made from either natural or synthetic fibers may be used. Such materials may include fiberglass, cotton, nylon, polyethylene, polypropylene and polyesters.

The preparation of the composite sheet may be carried out by conventional reinforced laminated sheet forming techniques. In general the outer semipermeable layer will be relatively thin as compared to the inner hydrophilic layer. This is to insure the maximum water flux through the outer layer. The semipermeable outer layer will usually have a thickness in the range of from about 50 $\mu$m to about 250 $\mu$m, and the inner hydrophilic layer will have a thickness in the range of from about 1,000 $\mu$m to about 3,000 $\mu$m.

A relatively simple method for preparing the composite sheet would include using commercially produced reverse osmosis membranes or membranes which can be treated afterwards to provide the necessary semipermeable properties as the top and bottom films in a continuous reinforced plastic laminate production facility. A woven fiber glass reinforcing layer along with an aqueous acrylamide monomer solution is encapsulated by the top and bottom films the outer edges of which are sealed. The resulting envelope is then pulled through a set of squeeze rollers to eliminate any entrapped air and to set the composite sheet thickness. The sheet is then passed through a region where it is exposed to ionizing radiation in order to polymerize the dissolved acrylamide into a water insoluble state, thus forming the hydrophilic inner layer and bonding all layers of the laminate into a strong composite sheet.

What is claimed is:

1. A process for recovering water of reduced salinity which comprises:
   (a) contacting a high salinity water with a composite sheet consisting essentially of contiguous layers of two different materials, said contiguous layers consisting of two outer layers and an inner layer, said outer layers forming a semipermeable barrier capable of allowing the passage of water while restricting the passage of ions and said inner layer forming a hydrophilic layer, whereby said sheet selectively sorbs relatively ion-free water into said inner layer through said outer layers;
   (b) withdrawing the composite sheet and the sorbed relatively ion-free water from contact with the high salinity water;
   (c) placing the sheet under sufficient physical pressure to force at least part of the sorbed relatively ion-free water out of the sheet; and
   (d) recovering a lower salinity water from the relatively ion-free water leaving the sheet.

2. The process of claim 1 wherein the high salinity water is seawater.

3. The process of claim 1 wherein the physical pressure is applied by a roller.

4. The process of claim 1 wherein the sheet is in the form of a belt.

5. The process of claim 1 wherein the inner hydrophilic layer is prepared from a gel.

6. The process of claim 5 wherein the inner layer is formed from or a polyacrylamide gel.

7. The process of claim 5 wherein the inner layer is formed from an anhydroglucose polymer.

8. A process for recovering water of reduced salinity which comprises:
   (a) contacting a high salinity water with a composite sheet consisting essentially of a central support layer between two contiguous inner hydrophilic layers which are covered on their outer surface by two outer semipermeable layers, said outer layers forming a semipermeable barrier capable of allowing the passage of water while restricting the passage of ions, whereby said sheet selectively sorbs relatively ion-free water into said hydrophilic layers through said outer semipermeable layers;
   (b) withdrawing the composite sheet and the sorbed relatively ion-free water from contact with the high salinity water;
   (c) placing the sheet under sufficient physical pressure to force at least part of the sorbed relatively ion-free water out of the sheet; and
   (d) recovering a lower salinity water from the relatively ion-free water leaving the sheet.

* * * * *